UNITED STATES PATENT OFFICE.

ERNEST HUMBERT, OF SOUTH CHICAGO, ILLINOIS.

REFINING STEEL.

943,192. Specification of Letters Patent. Patented Dec. 14, 1909.

No Drawing. Application filed August 12, 1909. Serial No. 512,477.

*To all whom it may concern:*

Be it known that I, ERNEST HUMBERT, a citizen of the Republic of France, residing in South Chicago, in the county of Cook and State of Illinois, have invented certain new and useful Improvements in Refining Steel, of which the following is a specification.

In the refining of steel to extract the phosphorus, sulfur and other impurities, it is customary to use an oxidizing slag which, among other reactions, takes up phosphorus by converting it into a phosphate; and to remove this slag by tilting the vessel containing it, or by skimming or other laborious methods before the final treatment with carbon, silicon, manganese, vanadium, tungsten, or the other additions which are commonly employed for determining the exact qualities and composition of the final product. The removal of the slag involves the removal of a small percentage of steel.

This invention provides for the obtaining of a product of high purity without the loss of time and labor involved in the old process, with an increase in the amount of steel secured and with a saving in current supposing the electric furnace be used.

The invention consists in the use of an oxidizing slag in such a way as to combine with the phosphorus and form a phosphate, and the adding of a reducing material to the slag containing the phosphate to convert the latter into a phosphid. The reducing material, usually ground coke or other form of carbon, floats on top of the slag and reduces the phosphate without interfering with the metal below. The strength of combination of the phosphid is so great that the phosphorus cannot be separated out of it by the iron without its first being changed back to phosphate, and this cannot occur in a reducing atmosphere. The electric furnace is especially applicable for the process because of the high temperature obtainable and the ease of maintaining a reducing atmosphere.

The specific materials and percentages used will vary according to the circumstances of different cases. The following is an example of the process as I have carried it out. An impure charge of steel from a Bessemer converter was used, analyzing approximately as follows:

Phosphorus _____ 0.10 per cent.
Sulfur _____ 0.16 " "
Manganese _____ 0.10 " "
Silicon _____ traces.
Carbon _____ 0.07 " "

This was transferred to an electric furnace of the Heroult type. A black slag containing four hundred pounds of mill scale and four hundred pounds of lime was added to a 15-ton charge of steel, making an oxidizing slag which became fluid when the steel below was thoroughly oxidized and all the phosphorus had passed into the slag as phosphate of lime, $P_2O_5 3(CaO)$. Upon this slag containing the phosphate of lime was added ground coke which floated thereon and reduced the phosphate therein, forming calcium phosphid ($P_2Ca_3$). Thereupon, without removing the slag, the additions above referred to were made to the molten steel. There was no return of phosphorus to the steel, and the final product contained Phosphorus _____ 0.005 per cent.
Sulfur _____ 0.005 " "

with carbon varying from 0.05 to 1.50 per cent., and silicon and manganese *ad libitum*.

What I claim is:—

1. The method of treating steel containing phosphorus, which consists in applying to it while molten an oxidizing slag to combine with the phosphorus and form a phosphate and adding a reducing material while maintaining a reducing atmosphere to convert the phosphate into phosphid.

2. The method of treating steel containing phosphorus, which consists in maintaining it molten in an electric furnace, applying an oxidizing slag to combine with the phosphorus and form a phosphate, and adding a reducing material while maintaining a reducing atmosphere to convert the phosphate into phosphid.

In witness whereof, I have hereunto signed my name in the presence of two subscribing witnesses.

ERNEST HUMBERT.

Witnesses:
CHAS. E. HILANDS,
PHILIP J. HACKET.